United States Patent
Redlich

(10) Patent No.: US 6,483,207 B1
(45) Date of Patent: Nov. 19, 2002

(54) AUTO-CENTERING LINEAR MOTOR

(76) Inventor: Robert Walter Redlich, 9 Grand Park Blvd., Athens, OH (US) 45701

( * ) Notice: Subject to any disclaimer, the term of this patent is extended or adjusted under 35 U.S.C. 154(b) by 1 day.

(21) Appl. No.: 09/863,713

(22) Filed: May 23, 2001

(51) Int. Cl.$^7$ .............................................. H02K 41/00
(52) U.S. Cl. ......................................... 310/12; 310/15
(58) Field of Search ............................ 310/12, 13, 14, 310/15, 17; 290/1 R

(56) References Cited

U.S. PATENT DOCUMENTS

| | | | |
|---|---|---|---|
| 3,648,084 A | * | 3/1972 | Laithwaite et al. ........... 310/13 |
| 4,602,174 A | | 7/1986 | Redlich ........................ 310/15 |
| 4,647,803 A | * | 3/1987 | Konecny .................. 310/49 R |

* cited by examiner

Primary Examiner—Nestor Ramirez
Assistant Examiner—Judson H. Jones
(74) Attorney, Agent, or Firm—Frank H. Foster; Kremblas, Foster, Phillips & Pollick

(57) ABSTRACT

Disclosed is a method of generating magnetic centering force on the permanent magnets of a reciprocating permanent magnet motor or generator, by allowing the ferromagnetic structure of the machine to saturate magnetically when the permanent magnets are near the ends of their travel.

1 Claim, 3 Drawing Sheets

$H'(L/2) < 10$ Oersted $H(L/2) > 20$ Oersted

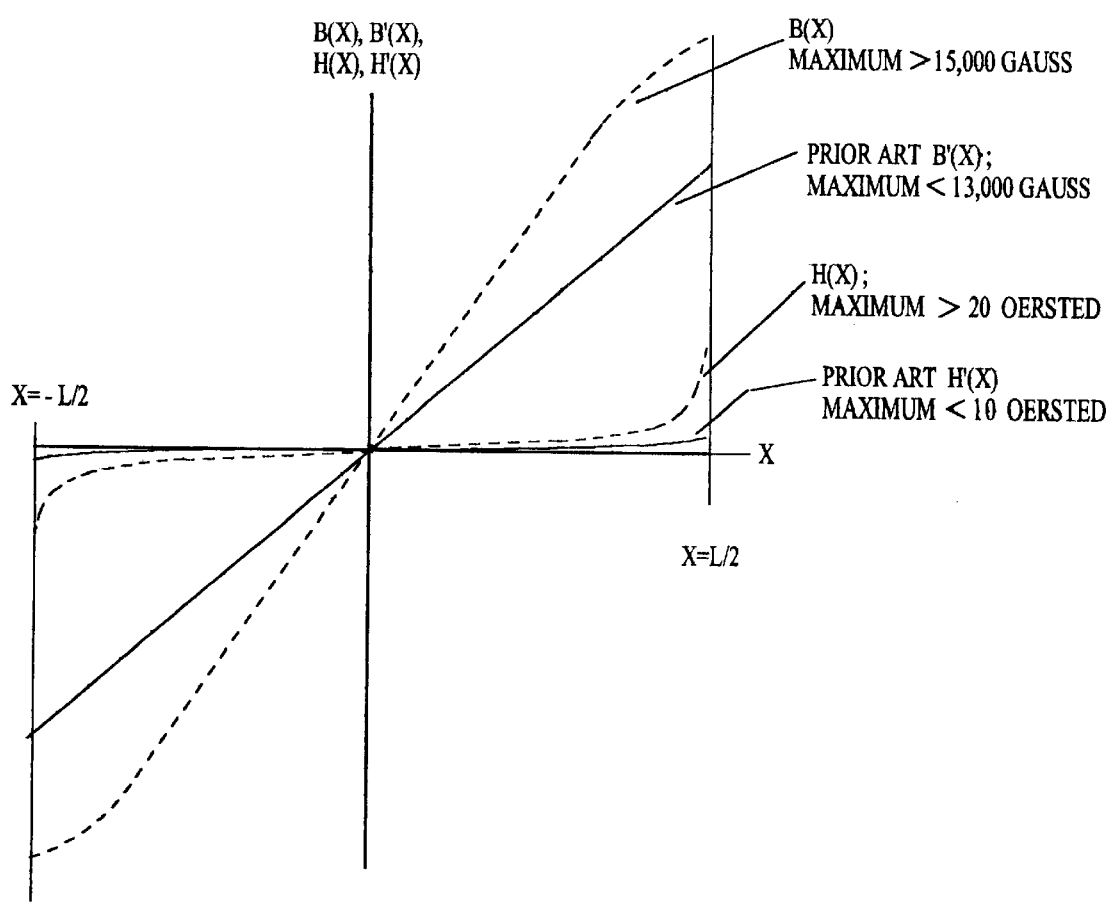

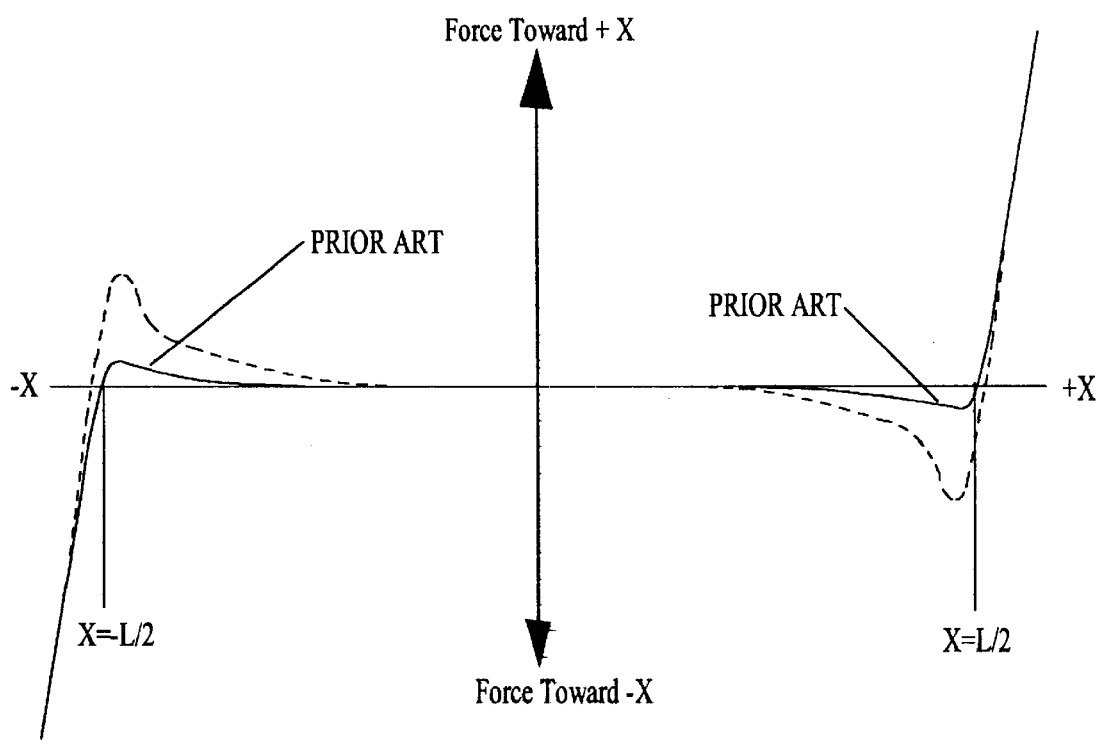

AUTO-CENTERING LINEAR MOTOR

REFERENCES
1. U.S. Pat. No. 4,602,174
2. Disclosure Document no. 172295

TECHNICAL FIELD

The invention is in the general field of reciprocating permanent magnet AC electric motors and generators. Specifically, it is a means of generating magnetic centering forces to confine reciprocating magnets within the air gaps of such machines.

BACKGROUND ART

Reference 1 discloses an AC electrical machine that can be used either as a generator to convert reciprocating motion of a permanent magnet ring to AC voltage, or as a motor to convert AC voltage to reciprocating motion of a permanent magnet ring. Referring to FIG. 4 of Reference 1, permanent magnets 50 reciprocate in a left-right direction, and if the machine is conventionally designed, there will be no force on the permanent magnets if there is no current in armature coil 56, provided the magnets do not emerge from the air gaps. If the magnets do so emerge, strong magnetic forces are generated that expel the magnets further. To prevent emergence of the magnets and their subsequent expulsion from the air gap, mechanical and/or magnetic centering springs have been used in prior art. The latter are disclosed in Reference 2. Centering springs introduce complication and increase cost. The object of the present invention is to provide magnetically generated centering force on the reciprocating magnets without adding cost or complexity.

BRIEF DISCLOSURE OF THE INVENTION

In the invention, the ferromagnetic structure (60,62,64,68 of FIG. 6, Reference 1) is designed unconventionally in that all or part of it is allowed to magnetically saturate as permanent magnets 50 of Ref. 1 approach the left or right extremes of the air gap in which they reciprocate. Theory shows, and experiment confirms, that magnetic saturation causes a force to be exerted on the reciprocating magnets in a direction such as to confine the magnets within the air gap. Conventional design avoids magnetic saturation because it degrades performance by lowering efficiency, and, in the case of generators, distorts output voltage waveform. In a linear motion AC motor-generator of the type disclosed in Ref. 1 but modified according to the invention, it is found that useful centering forces can be generated without incurring a significant performance penalty.

BRIEF DESCRIPTION OF THE DRAWINGS

In FIG. 1A, dimensions and magnetic quantities that are changed by the invention are identified by symbols.

FIG. 2 shows graphs of magnetic quantities in the iron structure according to prior art and in the invention. These quantities are plotted against displacement X of the magnets from their centered position. The quantities graphed are magnetic intensity H' (prior art), magnetic flux density B' (prior art), H (invention) and B(invention)

FIG. 3 shows, for prior art and the invention, graphs of magnetic force on the motor magnets plotted against displacement of the magnets from their centered position.

DETAILED DESCRIPTION OF THE INVENTION

Figure 1A:
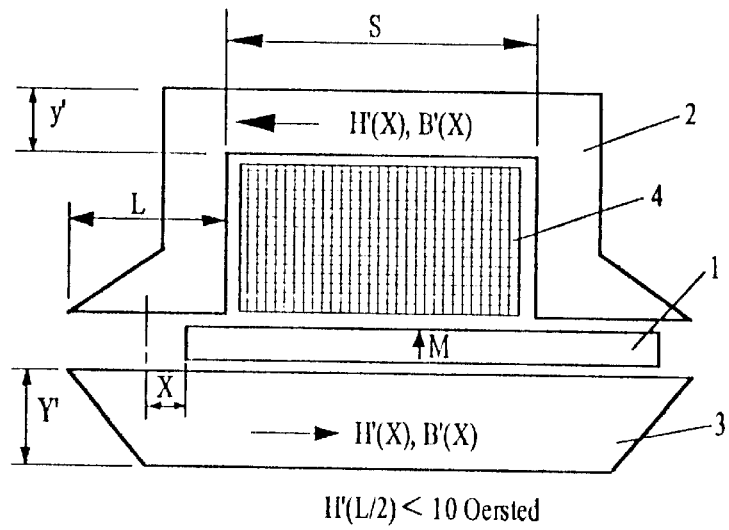
FIG. 1A is a cross sectional view of a linear, permanent magnet motor or generator according to prior art.

FIG. 1A is a cross-sectional view of a contemporary embodiment of a reciprocating permanent magnet motor or generator as disclosed in U.S. Pat. No. 4,602,174. The machine is substantially axially symmetric about axis A—A. A permanent magnet ring 1 is magnetized radially with magnetization M, and reciprocates parallel to A—A in air gaps bounded by outer ferromagnetic structure 2 and inner ferromagnetic structure 3. A coil of wire 4 surrounds inner ferromagnetic structure 3. X denotes axial displacement of the magnet ring from the position where it is centered axially within the air gaps. With no current in coil 4, the magnetic flux density B' and the magnetic intensity H' in the inner and outer ferromagnetic structures are functions of X and of the dimensions y' and Y', and are denoted in FIG. 1A by the conventional functional notation B' (X), H' (X) respectively.

FIG. 2 shows graphs of H' (X) and B' (X) in a prior art machine conventionally designed to avoid magnetic saturation. B' (X) is a substantially linear function of X with a maximum value typically less than 13000 Gauss, and H' (X) is typically below 10 Oersted for all X.

Figure 1B:
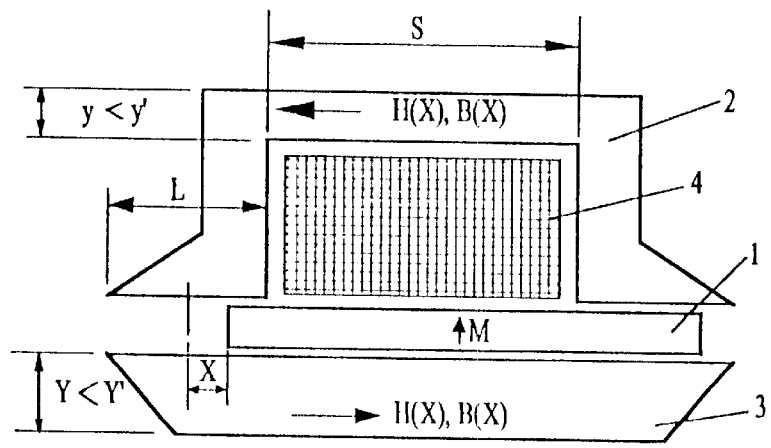
FIG. 1B is a cross-sectional view of a linear, permanent magnet motor or generator, in which dimensions and magnetic quantities that distinguish the invention from prior art are identified by symbols.

FIG. 1B is a cross sectional view of a linear permanent magnet motor or generator according to the invention. FIG. 1B the same as FIG. 1A except that one or both of dimensions y and Y are made sufficiently smaller than their prior art counterparts y' and Y' so that magnetic saturation occurs near X=L/2 and X=−L/2, which are the values of X at which magnets 1 begin to emerge from the air gap between iron structures 2 and 3.

FIG. 2 shows graph of H(X) and B(X) in a motor or generator according to the invention. Near $|X|=L/2$, H(X) rises above 20 Oersted, exceeding typical saturation for electrical steel, which is about 10 oersted. B(X) near $|X|=L/2$ falls below a. linear projection of its values at small X, and reaches a maximum value exceeding 15000 Gauss.

The purpose of allowing parts of. ferromagnetic structures 2 and 3 to saturate when magnet ring 1 nears either end of the air gaps is to generate magnetic forces that prevent the magnet ring from leaving the air gap. The existence of such forces is predicted by the theory of electromagnetic energy, which teaches that, in order to increase magnetic flux density B by a differential amount dB in a differential volume dV, energy equal to (H×dB×dV) is required. In the invention, the source of such energy is mechanical work done on the magnet ring by an axial force moving through a distance dX, from which it follows that the force F on the magnet ring can be found from the following equation;

$$F = -\int H \times dB/dX \times dV \qquad \text{equation (1)}$$

The minus sign in equation (1) means F is in a direction opposite to dX. The integral must in principle be taken over all of space, but in prior art and in the invention, the dominant contribution. to it is from the volume occupied by ferromagnetic structures 2 and 3 of FIGS. 1A and 1B, provided the. magnet ring does not leave the air gaps. In prior art, magnetic saturation is avoided by dimensioning the ferromagnetic structure so that H' is considerably less than 10 Oersted for all X (5 Oersteds is typical), and F is too low to be of practical use in confining the magnet ring. In the invention, however, saturation typically raises H(L/2) to above 20 Oersted, resulting in a much larger value of F that will prevent magnet ring 1 from leaving the air gap.

FIG. 3 shows graphs of F in prior art and in the invention. In both cases the magnets will. be. expelled from the air gap if $|X| \geq L/2$, as indicated by rapidly increasing force for $|X| \geq L/2$. In the invention, but not in prior art, there is a relatively large restraining force to prevent magnet ring 1 from reaching $X=L/2$ and subsequently being expelled from the air gap.

Considerable variation is possible within the spirit of the invention. For example, magnetic saturation could be confined to outer ferromagnetic structure 2, or to inner ferromagnetic structure 3, rather. than existing in both structures.

I claim:

1. An electromechanical transducer for converting reciprocating motion to alternating voltage or for converting alternating voltage to reciprocating motion, said transducer comprising the combination a) through d) as follows, a) a permanent magnet in the shape of a ring bounded by two circular cylinders and two parallel planes, both cylinders coaxial about an axis A—A, both planes perpendicular to axis A—A, the permanent magnet being magnetized substantially perpendicular to the surfaces of the cylinders, the permanent magnet length being (S+L) measured in a direction parallel to axis A—A, where S and L are defined below, b) a plurality of stationary and substantially identical flux loop members composed of ferromagnetic material, the flux loop members extending generally radially outward from said axis A—A, each flux loop member having a pair of air gaps separated by a distance S measured parallel to axis A—A, all said pairs of gaps being bounded by two cylindrical surfaces, both surfaces coaxial with axis A—A, each air gap having length L measured parallel to axis A—A, said permanent magnet ring positioned within the plurality of air gap pairs and movable in a direction parallel to axis A—A, the distance so moved, measured from the location where the magnet ring is axially centered in the air gaps, being denoted here by X, c) an armature coil wound to encircle the central portions of all of said flux loop members, d) one or more regions of said flux loop members where, for the purpose of creating a magnetically generated axial centering force on said magnet ring, the ferromagnetic material comprising said region or regions is magnetically saturated when $|X|=L/2$ and current in said armature coil is zero, saturation being defined here as magnetic intensity H exceeding 20 Oersteds.

* * * * *